United States Patent [19]

Makabe et al.

[11] 4,242,973
[45] Jan. 6, 1981

[54] SEWING MACHINE WITH ELECTRONIC PATTERNING SYSTEM

[75] Inventors: Hachiro Makabe, Fussa; Kazuo Watanabe; Hideaki Takenoya, both of Hachioji; Toshihide Kakinuma, Tokyo; Toshiaki Kume, Tachikawa, all of Japan

[73] Assignee: Janome Sewing Machine Co. Ltd., Tokyo, Japan

[21] Appl. No.: 80,072

[22] Filed: Sep. 28, 1979

Related U.S. Application Data

[63] Continuation-in-part of Ser. No. 926,627, Jul. 20, 1978, abandoned, which is a continuation of Ser. No. 876,326, Feb. 8, 1978, which is a continuation of Ser. No. 715,691, Aug. 19, 1976, Pat. No. 4,086,862.

[30] Foreign Application Priority Data

Oct. 17, 1975 [JP] Japan ................................ 50-124306

[51] Int. Cl.³ .............................................. D05B 3/02
[52] U.S. Cl. .............................................. 112/158 E
[58] Field of Search .......... 112/158 E, 121.11, 121.12; 318/567, 569

[56] References Cited

U.S. PATENT DOCUMENTS 4,145,982   3/1979   Kume et al. ...................... 112/158 E

FOREIGN PATENT DOCUMENTS 2830242   6/1979   Fed. Rep. of Germany ....... 112/158 E Primary Examiner—Peter P. Nerbun
Attorney, Agent, or Firm—Michael J. Striker

[57] ABSTRACT

The electronic patterning system of a sewing machine comprises a main pattern memory consisting of a large number of individually addressable storage locations. Instead of each storage location storing only the stitch-control data for one stitch of one pattern, one section of each of at least some of the storage locations stores stitch-control data pertaining to one stitch of one pattern but with another section of the same storage location storing stitch-control data pertaining to a different stitch, e.g., a stitch of a completely different pattern. Thus, it may be that for some stored patterns one section of each storage location used for a pattern stores needle-bar position commands with the other section of each such storage location storing cloth-feed commands. However, if the cloth-feed commands would anyway be identical, one after the next, for each stitch of the pattern, the second sections of these storage locations are not wasted on storage of this invariant cloth-feed command data, but instead are used, for example, for storing needle-bar position commands of an entirely different pattern, with the invariant cloth-feed command data being applied to the cloth-feeding unit of the machine not from the pattern memory but instead from an auxiliary memory which responds to selection of this pattern by applying the requisite unvarying cloth-feed command data for such pattern to the cloth-feeding unit of the machine.

3 Claims, 10 Drawing Figures

FIG_2

FIG.4(b)
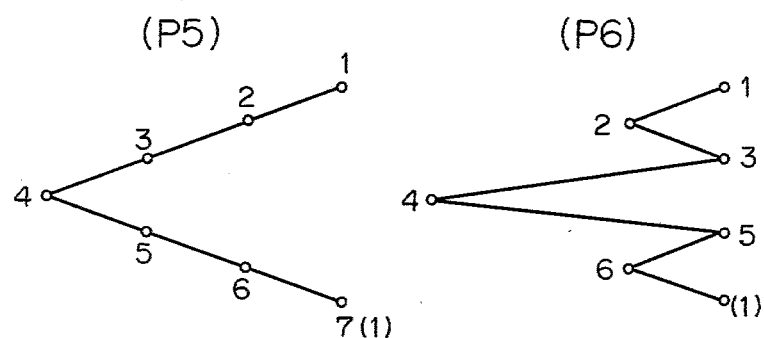
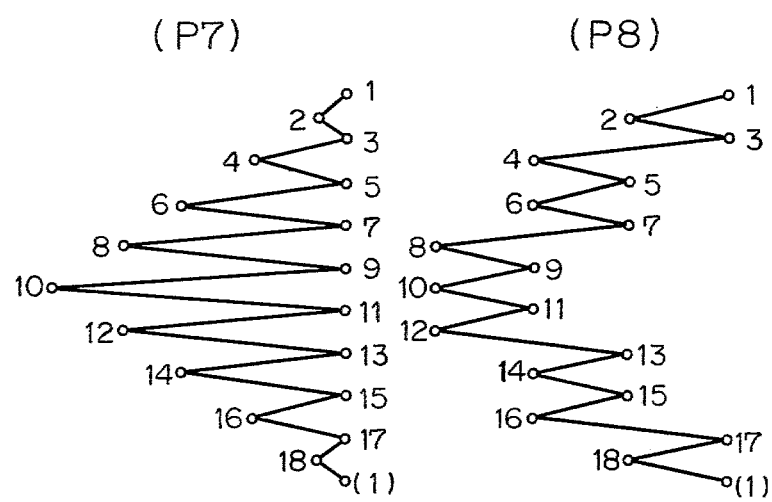

FIG. 6

|  | C | X | Y | C | X | Y |  |
|---|---|---|---|---|---|---|---|
| P1→ | 00 | 00 |    | 1F | 14 | 1E |  |
|     | 01 | 1E |    | 20 | 1E | 1E |  |
|     | 02 | 1F |    | 21 | 14 | 00 |  |
| P3→ | 03 | 00 | 00 | 22 | 0A | 1E |  |
|     | 04 | 0A | 1E | 23 | 1F |    |  |
|     | 05 | 14 | 1E | 24 |    | 00 | ←P6 |
|     | 06 | 1E | 00 | 25 |    | 0D |  |
|     | 07 | 14 | 1E | 26 |    | 00 |  |
|     | 08 | 0A | 1E | 27 |    | 1E |  |
|     | 09 | 1F |    | 28 |    | 00 |  |
| P4→ | 0A | 0F | 1B | 29 |    | 0D |  |
|     | 0B | 16 | 03 | 2A | 1F |    |  |
|     | 0C | 1E | 1B | 2B | 00 | 00 | ←P7,P8 |
|     | 0D | 16 | 0F | 2C | 03 | 0A |  |
|     | 0E | 1E | 0F | 2D | 00 | 00 |  |
|     | 0F | 16 | 1B | 2E | 0A | 14 |  |
|     | 10 | 1E | 03 | 2F | 00 | 0A |  |
|     | 11 | 16 | 1B | 30 | 11 | 14 |  |
|     | 12 | 0F | 03 | 31 | 00 | 0A |  |
|     | 13 | 0F | 03 | 32 | 17 | 1E |  |
|     | 14 | 0F | 1B | 33 | 00 | 14 |  |
|     | 15 | 08 | 03 | 34 | 1E | 1E |  |
|     | 16 | 00 | 1B | 35 | 00 | 14 |  |
|     | 17 | 08 | 0F | 36 | 17 | 1E |  |
|     | 18 | 00 | 0F | 37 | 00 | 0A |  |
|     | 19 | 08 | 1B | 38 | 11 | 14 |  |
|     | 1A | 00 | 03 | 39 | 00 | 0A |  |
|     | 1B | 08 | 1B | 3A | 0A | 14 |  |
|     | 1C | 1F |    | 3B | 00 | 00 |  |
| P5,P2→ | 1D | 00 | 1E | 3C | 03 | 0A |  |
|     | 1E | 0A | 00 | 3D | 1F |    |  |

FIG.7

| | ST | x | y | Ys |
|---|---|---|---|---|
| P1 | 0 | 1 | 0 | 1E |
| P2 | 1 | 1 | 1 | |
| P3 | 0 | 1 | 1 | |
| P4 | 0 | 1 | 1 | |
| P5 | 0 | 1 | 0 | 15 |
| P6 | 0 | 0 | 0 | 12 |
| P7 | 0 | 1 | 0 | 12 |
| P8 | 0 | 0 | 0 | 12 |

FIG.8

| STITCH | NEEDLE POS. | FEED | 16 - system | |
|---|---|---|---|---|
| | | | NEEDLE POS. | FEED |
| 1 | 0 | +3 | 0 0 | 12 |
| 2 | 10 | +3 | 0 A | 12 |
| 3 | 0 | +3 | 0 0 | 12 |
| 4 | 20 | +3 | 1 4 | 12 |
| 5 | 10 | +3 | 0 A | 12 |
| 6 | 20 | +3 | 1 4 | 12 |
| 7 | 10 | +3 | 0 A | 12 |
| 8 | 30 | +3 | 1 E | 12 |
| 9 | 20 | +3 | 1 4 | 12 |
| 10 | 30 | +3 | 1 E | 12 |
| 11 | 20 | +3 | 1 4 | 12 |
| 12 | 30 | +3 | 1 E | 12 |
| 13 | 10 | +3 | 0 A | 12 |
| 14 | 20 | +3 | 1 4 | 12 |
| 15 | 10 | +3 | 0 A | 12 |
| 16 | 20 | +3 | 1 4 | 12 |
| 17 | 0 | +3 | 0 0 | 12 |
| 18 | 10 | +3 | 0 A | 12 |

FIG. 9

|     | L  | A  | X' | Y' | L  | A  | X' | Y' |
|-----|----|----|----|----|----|----|----|----|
| P1→ | 00 | 08 | 00 |    | 1A | 1B | 00 | 0F |
| P2→ | 01 | 02 | 0A | 1E | 1B | 1C | 08 | 1B |
| P3→ | 02 | 09 | 00 | 00 | 1C | 1D | 00 | 03 |
| P4→ | 03 | 0D | 0F | 1B | 1D | 03 | 08 | 1B |
| P5→ | 04 | 05 | 00 | 0D | 1E | 1F | 14 | 0D |
| P6→ | 05 | 1E | 0A | 00 | 1F | 20 | 1E | 00 |
| P7→ | 06 | 07 | 00 | 0A | 20 | 21 | 14 | 1E |
| P8→ | 07 | 22 | 03 | 00 | 21 | 04 | 0A | 00 |
|     | 08 | 00 | 1E |    | 22 | 23 | 00 | 0A |
|     | 09 | 0A | 0A | 1E | 23 | 24 | 0A | 00 |
|     | 0A | 0B | 14 | 1E | 24 | 25 | 00 | 14 |
|     | 0B | 0C | 1E | 00 | 25 | 26 | 11 | 0A |
|     | 0C | 01 | 14 | 1E | 26 | 27 | 00 | 14 |
|     | 0D | 0E | 16 | 03 | 27 | 28 | 17 | 0A |
|     | 0E | 0F | 1E | 1B | 28 | 29 | 00 | 1E |
|     | 0F | 10 | 16 | 0F | 29 | 2A | 1E | 14 |
|     | 10 | 11 | 1E | 0F | 2A | 2B | 00 | 1E |
|     | 11 | 12 | 16 | 1B | 2B | 2C | 17 | 14 |
|     | 12 | 13 | 1E | 03 | 2C | 2D | 00 | 1E |
|     | 13 | 14 | 16 | 1B | 2D | 2E | 11 | 0A |
|     | 14 | 15 | 0F | 03 | 2E | 2F | 00 | 14 |
|     | 15 | 16 | 0F | 03 | 2F | 30 | 0A | 0A |
|     | 16 | 17 | 0F | 1B | 30 | 31 | 00 | 14 |
|     | 17 | 18 | 08 | 03 | 31 | 06 | 03 | 00 |
|     | 18 | 19 | 00 | 1B | 32 |    |    |    |
|     | 19 | 1A | 08 | 0F | 33 |    |    |    |

SEWING MACHINE WITH ELECTRONIC PATTERNING SYSTEM

CROSS REFERENCE TO RELATED APPLICATION

The present application is a continuation-in-part of copending application Ser. No. 926,627 filed July 20, 1978 now abandoned; which, in turn, was a continuation-in-part of application Ser. No. 876,326 filed Feb. 8, 1978 which, in turn, was a continuation of application Ser. No. 715,691 filed Aug. 19, 1976 now U.S. Pat. No. 4,086,862 issued May 2, 1978.

BACKGROUND OF THE INVENTION

In the system of U.S. Pat. No. 4,086,862, no use is made of the usual addressing counter customarily employed for read-out of the ROM or RAM which stores the stitch-control data for the plurality of selectable stitch-patterns which the system is to afford. Instead, operator selection of one of the available stitch-patterns serves to address the initial ROM storage location for that pattern. The thusly addressed storage location stores bits determinative of the transversely shifted position to be assumed by the transversely displaceable needle bar of the sewing machine, and also bits determinative of the amount by which cloth is to be fed forwards or backwards in going from the first to the second needle penetration location of the stitch-pattern, and furthermore bits which are determinative of the address of the second ROM storage location for that pattern.

In that way, after the initial storage location of the selected pattern has been externally addressed, the address locations for the subsequent stitches of the selected stitch-pattern are each determined, at least in part, by next-address data stored at each addressed storage location. Accordingly, after addressing of the initial storage location, subsequent addressing occurs, so to speak, from inside out, the ROM furnishing its own next-address signals, or at least contributing to their establishment. As a result, it ceases to be necessary for the successive storage locations of a single one of the stitch patterns to have numerically consecutive addresses such as are needed when read-out of the ROM is controlled, as in prior art, by an addressing counter which produces address signals in simple numerical order. Thus, for example, if a ROM, and its cooperating circuitry, has originally been sectored into ten storage sectors, each consisting of e.g. sixteen consecutive storage locations, for the storage of ten selectable patterns, it becomes possible to substitute a ROM whose e.g. ten patterns are not of sixteen stitches or storage locations each but instead various as to number of storage locations. For example, a simple stitch pattern which requires only three storage locations can be stored in the first three storage locations of the first of the ten storage sectors. In order that the remaining thirteen storage locations of the first storage sector not be wasted, a more complicated stitch pattern which requires twenty storage locations can be stored, to the extent of sixteen of its stitches, in the sixteen storage locations of the second storage sector, with the data for its remaining four stitches stored in otherwise unutilized ones of the thirteen empty storage locations of the first sector; and so forth. This reorganization of stored stitch-pattern control data can be implemented, in the extreme case, without any modification whatsoever of the peripheral circuitry which cooperates with the ROM. The ability to replace one pattern ROM with another of different data organization, without any need to respect predetermined storage sectors of fixed size, can result in valuable flexibility, whether at the level of a changeover capability for existing machines, or at the manufacturer's level when new and different stitch-patterns are to be offered on an existing product line.

Although the importance of such flexibility and freedom of organization and reorganization is considerable, it does require that each addressed storage location of the pattern memory contain additional bits, i.e., next-address bits in addition to true pattern-control bits. Relative to problematic instances of pattern assignment or pattern reorganization, especially those involving storage of both few-stitch and many-stitch patterns, the need for additional bits may not prevent an actual decrease in the total number of bits which the pattern memory need store. However, relative to the ideal case (e.g., where all patterns are of identical and numerically convenient stitch-number and, due to lack of pattern-flexibility worries, a mere addressing counter can be used), the fact remains that in principle additional bit-storage capability is required, and reduction in such bit-storage capability is very desirable.

SUMMARY OF THE INVENTION

Accordingly, it is an object of the invention to be able to compensate for the increased bit-storage capacity required for the storage of next-address signals, by making more efficient use of the available bit locations within the ROM when assigning the locations of actual pattern or stitch-control data, so as to be able to implement a given set of stitch patterns using fewer bit storage locations for storage of actual stitch-control bits.

Although this object is posed with respect to compensating for the additional bit-storage capacity required for the next-address data, it is a more general object of the invention to be able more efficiently to utilize bit-storage locations for the assignment of stitch-control bits, even when the next-address signal technique in question is not employed and resort is instead had to a simple addressing counter.

This involves a departure from prior-art practice in the assignment of stitch-control data. In the prior art, it has been customary to store the stitch-control data for each stitch of a stitch-pattern in one addressable storage location. For example, in the case of systems of the addressing-counter type, each addressable storage location may have a 10-bit capacity and store 5 bits pertaining to transverse needle displacement and 5 bits pertaining to the amount and direction of cloth feed. Similarly, in systems incorporating the next-address-signal technique described above, each storage location may, in addition, store 5 further bits pertaining to the address of the next storage location for the next stitch of the pattern, with each storage location having in that event a 15-bit capacity.

This can be a quite wasteful practice. It is the result of a somewhat unthinking adherence to earlier perforated-tape patterning systems, in which each transverse row of perforations was relegated to contain the switch-control data for one stitch of one pattern. The similar organization of data within a static pattern memory is a mere analog to such perforated-tape thinking and does not efficiently utilize the really non-analogous capabilities of a static pattern memory.

For example, consider the case where each addressable storage location of the memory stores 5 bits of needle-displacement data, 5 bits of cloth-feed data and perhaps also 5 bits of next-address data. For one or several of the stored patterns, the amount and/or direction of cloth feed may vary from one constituent stitch or needle penetration to the next, with the 5-bit capacity associated with cloth-feed data accordingly being necessary and highly utilized. However, in practice, it will generally be the case that one, or a considerable number, of the stored stitch patterns are characterized by constancy of cloth feed, i.e., the amount and direction of cloth feed being identical from one constituent stitch or needle penetration of the stitch-pattern to the next. In that event, the 5-bits of storage capacity possessed by each and every one of the storage locations associated with that pattern is in general wasted, because the 5 bits of cloth-feed data are the same in each and every one of the storage locations pertaining to that pattern. It is very typical for a considerable number of the stored patterns to be thusly characterized by constant cloth feed amount and direction, or by constant cloth feed amount and occassional direction reversals, or by sizable intervals of constant cloth-feed amount and direction, and so forth. The resultant long stretches of identical and unvarying stitch-control data, especially that pertaining to cloth feed, represent inefficient use of bit-storage capacity.

In accordance with the present invention, at least some of the individually addressable storage locations each store stitch-control bits pertaining to one pattern but also stitch-control bits pertaining to at least one other selectable pattern.

For example, if the amount and direction of cloth feed is invariant in going from one to the next stitch of the whole of one selected pattern, the storage locations associated with that pattern do not store cloth-feed data at all. Instead part of the storage capacity of each storage location associated with such pattern is utilized for the storage of stitch-control data pertaining to another one of the selectable patterns.

Thus, if two selectable patterns are each characterized by constancy of cloth-feed amount and direction, and for simplicity assuming that they each consist of the same number of stitches, e.g., 12 stitches, 12 storage locations are shared by the two patterns, each of the 12 storage locations storing the needle-displacement data for one pattern and the needle-displacement data for another pattern.

This is set forth as an easily understood example. It is not necessary that two patterns which share addressable storage locations in this way be each constituted by the same number of constituent stitches. Considerable complexity and freedom of organization is made possible.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIGS. 4(a) and 4(b) are more detailed depictions of the eight stitch-patterns of FIG. 3;

FIG. 6 is a tabulation of hexadecimal numbers representing 5-bit code words stored in the main memory of the embodiment of FIG. 2;

FIG. 7 depicts the control data stored in the auxiliary memory of either of the embodiments of FIGS. 2 and 5;

FIG. 8 depicts, for the pattern P8 of FIG. 6, the correspondence between the code employed and actual physical distances;

FIG. 9 is a tabulation of hexadecimal numbers representing 5-bit code words stored in the main memory of the embodiment of FIG. 5.

DESCRIPTION OF THE PREFERRED EMBODIMENTS

Figure 1:
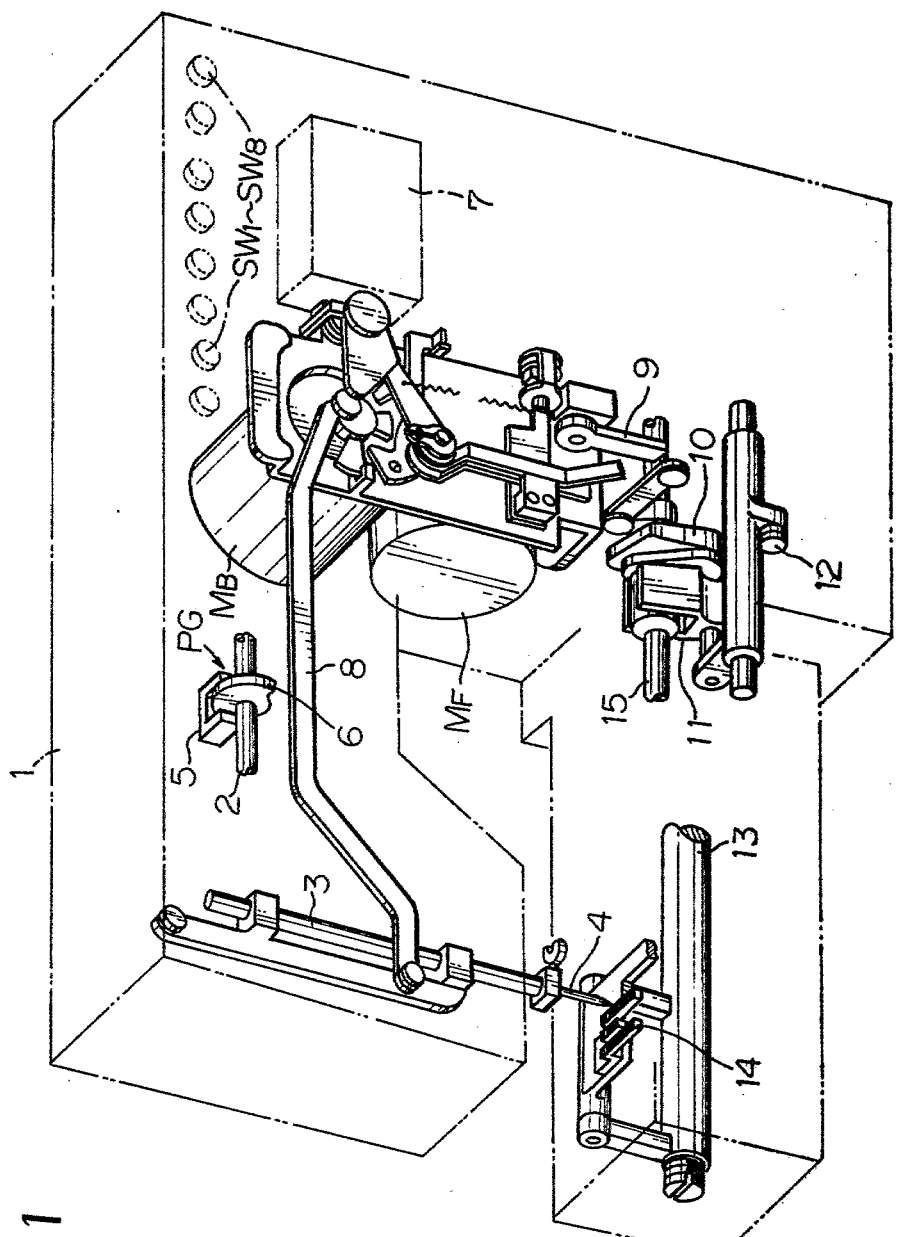
FIG. 1 depicts mechanical components of a sewing machine provided with an electronic patterning system in accordance with the invention.

In FIG. 1, numeral 1 denotes the housing of a sewing machine, the housing accommodating an upper drive shaft 2 driven by a (non-illustrated) drive motor and operative for vertically reciprocating a needle bar 3 provided with a needle 4. PG denotes a pulse generator comprised of a U-shaped sensor 5 secured to the machine housing and provided with a (non-illustrated) LED and phototransistor serving to sense the presence of a light-blocking projection 6 provided on drive shaft 2, so as to generate one output pulse per upper-shaft rotation. The output signal produced by sensor 5 is at high logic level when the needle is located at a predetermined height above the (non-illustrated) needle plate of the machine, and is at low logic level when the needle is located a predetermined distance below the needle plate of the machine. Numeral 7 denotes the pattern-control electronics of the machine, depicted in detail in FIG. 2. A stepper motor $M_B$ is coupled to the needle bar 3 through the intermediary of a transmission rod 8 for controlling displacement of the needle in the direction transverse to the direction of cloth feed. Another stepper motor $M_F$ is mechanically coupled to the feed dog 14 for controlling the cloth-feeding movement thereof, through the intermediary of a link 9, a feed adjuster element 10, a forked element 11, a connecting link 12 and a horizontally extending feeding shaft 13. Numeral 15 denotes a lower shaft rotated in timed relationship to the upper drive shaft 2 and operative for driving the machine's (non-illustrated) loop taker. A set of pattern-selector pushbuttons SW1–SW8 are provided on the exterior of the machine's housing 1.

Figure 2:
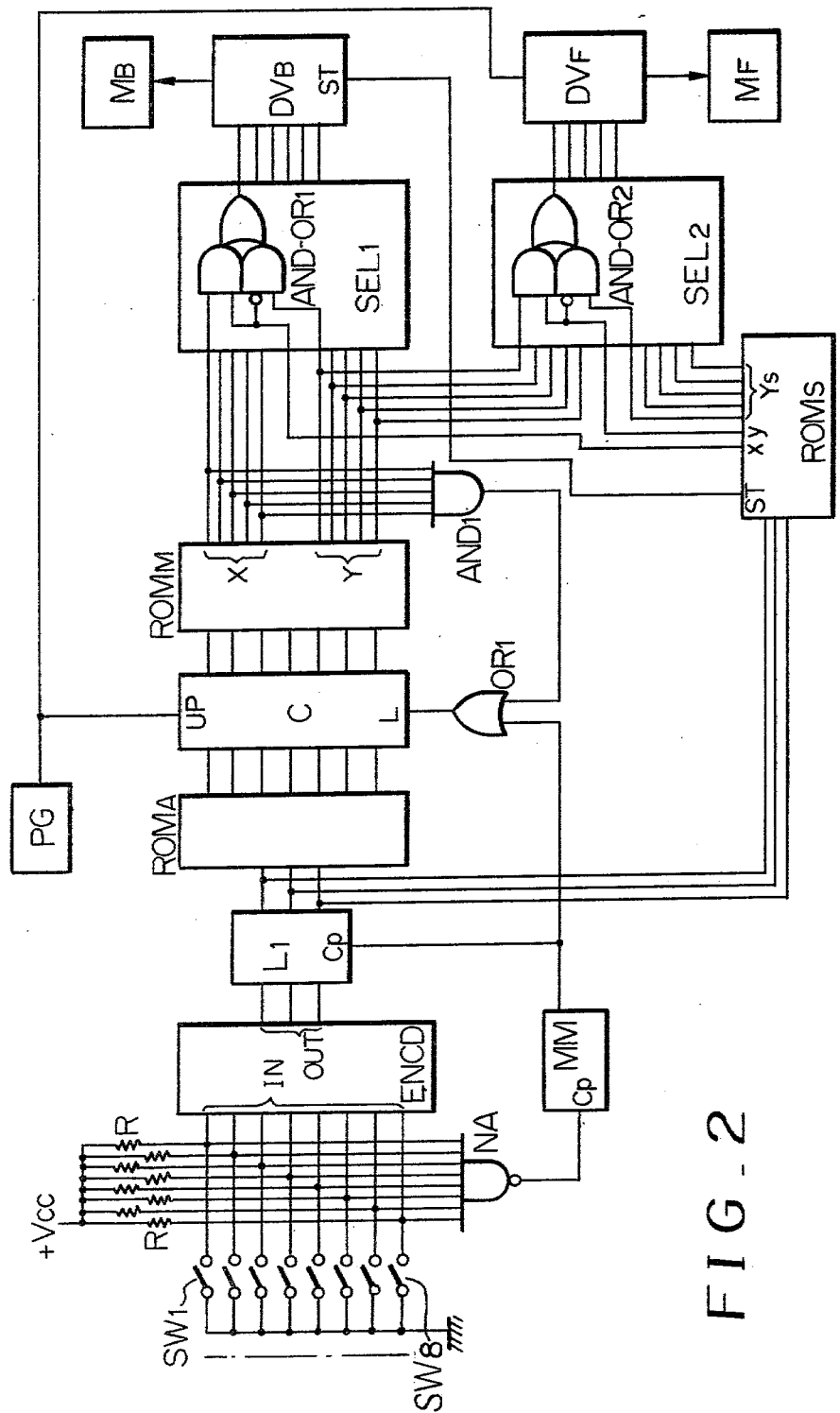
FIG. 2 depicts the circuitry of a first exemplary embodiment of an inventive patterning system.

FIG. 2 depicts the circuitry of a first exemplary embodiment of the inventive patterning system. Each of pattern selector switches SW1–SW8 has one terminal connected to ground and the other connected to operating voltage $+V_{CC}$ via a respective resistor R. Each selector switch is further connected to a respective input of an encoder ENCD. Encoder ENCD has a 3-bit output OUT connected to the three address inputs of an initial-address memory $ROM_A$ via a three-input, three-output latch circuit L1. Latch L1 has a trigger input Cp connected to the output of a monostable multivibrator MM whose own trigger input Cp is connected to the output of a NAND-gate NA. When all of pattern selector switches SW1–SW8 are open, the output of NAND-gate NA is a "0" signal, but if any of the selector switches is closed, an output "1" signal is produced.

The initial-address memory $ROM_A$ has a 7-bit output and responds to the 3-bit pattern-identifying code word produced by encoder ENCD by producing at its output a 7-bit word identifying the address of that storage location of a main or pattern memory $ROM_M$ which contains the initial or first-stitch control data for the selected pattern. In particular, the initial address applied to the input of address counter C is loaded into the counter when a pattern selector switch is closed and the resultant "1" pulse produced at the output of MM is transmitted via an OR-gate OR1 to the load input L of presettable counter C. Address counter C counts up the pulses produced by the pulse generator PG already described with respect to FIG. 1, one pulse per upper-shaft rotation.

Static memory $ROM_M$ stores the control data needed for the selectable patterns. Main memory $ROM_M$ contains 64 individually addressable storage locations. Each individual storage location has a 10-bit storage capacity. 5 bits of the 10-bit capacity of each storage location are reserved for X-data, and the other 5 bits for Y-data. When any individual storage location of memory $ROM_M$ is addressed, the 5-bits of X-data in that storage location appear at the indicated X-outputs, and the 5 bits of Y-data appear at the indicated Y-outputs.

The five X-outputs of memory $ROM_M$ are connected to the inputs of an AND-gate AND1, whose output is connected via OR1 to the load input L of address counter C. The last storage location associated with a particular pattern contains five "1" bits in its X-data section. When these appear at the X-output of the memory, the initial address furnished by initial-address memory $ROM_A$ is reloaded into address counter C, thereby returning the counter to its preset count, for repetition of the pattern indefinitely until a different pattern is selected.

The repetition of each selected pattern is determined, in this embodiment, by the X-data only, irrespective of what other use is made of the X-data for a particular pattern, and irrespective of whether the X-data is otherwise used at all for a particular pattern.

The five X-outputs of $ROM_M$ are connected to a first set of five inputs of a selector stage SEL1. The second set of five inputs of SEL1 are connected to the Y-outputs of $ROM_M$. First selector stage SEL1 is operative for transmitting to its five outputs either the five bits on the X-outputs of $ROM_M$ or else the five bits on the Y-outputs of $ROM_M$.

An auxiliary memory $ROM_S$ contains eight individually addressable storage locations. Each storage location has an 8-bit storage capacity. Five of the eight bits of each storage location are used for storage of a 5-bit control word Ys, and the three remaining bits of capacity are respectively used to store a control bit ST, a control bit x and a control bit y. The three address-signal inputs of auxiliary memory $ROM_S$ are connected via latch L1 to the outputs of encoder ENCD for receipt of the pattern-identifying code word produced by the latter.

The bit produced on the x-output of auxiliary memory $ROM_S$ determines whether SEL1 transmits the X bits or the Y bits from $ROM_M$. In particular, selector stage SEL1 comprises five AND-OR-gate stages, of which the one AND-OR1 is explicitly shown. AND-OR stage AND-OR1 comprises first and second AND-gates whose outputs are connected to the two inputs of an OR-gate. The output of the OR-gate is connected to the first of the five outputs of SEL1. The first input of the first AND-gate is connected to the first X-output of $ROM_M$. The second input of the first AND-gate is connected to the x-output of auxiliary memory $ROM_S$. The first input of the second AND-gate is likewise connected to the x-output of auxiliary memory $ROM_S$, but via the inverter symbolically indicated. The second input of the second AND-gate and AND-OR1 is connected to the first of the five Y-outputs of $ROM_M$.

The second (non-illustrated) one of the five AND-OR stages of SEL1 is identically connected to the X-output of $ROM_S$, but is connected to the second x-output and the second Y-output of $ROM_M$, and to the second output of SEL1. And so forth.

When bit x is a "1" signal SEL1 transmits to its outputs the 5-bit word appearing on the X-outputs of $ROM_M$. When bit x is a "0" signal SEL1 transmits to its output the 5-bit word appearing on the Y-outputs of $ROM_M$.

SEL2 denotes a second selector stage, whose internal configuration is identical to that of SEL1, just described. The upper five inputs of SEL2 are connected to the Y-outputs of $ROM_M$. The lower five inputs of SEL2 are connected to the five Ys-outputs of auxiliary memory $ROM_S$. The middle or control input of SEL2 is connected to the y-output of $ROM_S$. When the y-bit is a "1" signal, SEL2 transmits the 5-bit word from the Y-outputs of $ROM_M$. When the y-bit is a "0" signal, SEL2 transmits the 5-bit word from the Ys-outputs of $ROM_S$.

The five outputs of selector stage SEL1 are connected to the five inputs of a motor-control circuit $DV_B$ for the stepper motor $M_B$ of FIG. 1. As already stated, motor $M_B$ serves to transversely shift the needle bar 3.

The five outputs of selector stage SEL2 are connected to the five inputs of a motor-control circuit $DV_F$ for the stepper motor $M_F$ of FIG. 1. As already stated, motor $M_F$ serves to drive the feed dog 14 of FIG. 1.

Motor-control circuit $DV_B$ has an override input ST connected to receive the ST output bit of auxiliary memory $ROM_S$. When the ST-bit is a "1" signal, the 5-bit word applied to the left five inputs of $DV_B$ is overriden. In particular, circuit $DV_B$ causes motor $M_B$ to move the needle bar 3 to centered or middle position, for simple straight stitching, or for a stitch-pattern which may include cloth-feed direction reversals but no zig-zag or transverse-needle-displacement action.

Thus, except when straight stitching is commanded by the ST bit, motor-control stage $DV_B$ implements transverse displacement of the needle bar 3 either in accordance with the X-data from $ROM_M$ or else in accordance with the Y-data.

Similarly, motor-control stage $DV_F$ implements forwards and/or reverse cloth feed either in accordance with the Y-data from $ROM_M$ or else in accordance with the 5-bit word Ys from $ROM_S$.

Motor-control stage $DV_F$ additionally has an enablement input connected to the output of pulse generator PG. When the output voltage of the latter is at logic level "0", $DV_F$ responds to the 5-bit word applied to its data inputs.

Figure 3:
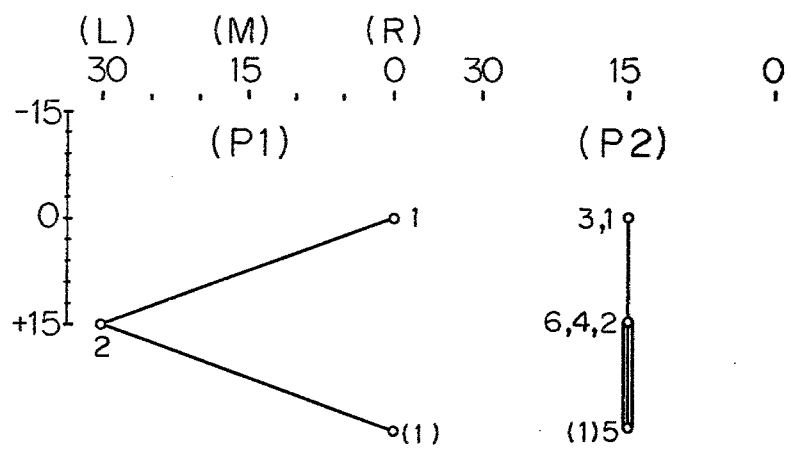
FIG. 3 depicts the appearance of the eight stitch-patterns selectable in the exemplary embodiments discussed herein.

FIG. 3 depicts the eight patterns P1–P8 which the exemplary patterning system affords the user.

Figure 4A:
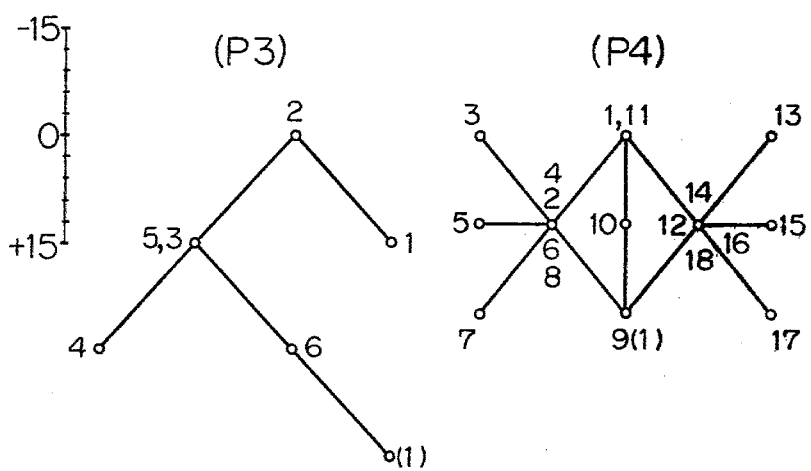

FIG. 4 depicts the patterns P1–P8 of FIG. 3 in greater detail. The transverse displacement of the needle bar is implemented within a range of 31 physical distance units. The transverse-displacement coordinate 0 (R) is the rightmost position which the needle bar can assume; 30 (L) is the leftmost position; and 15 (M) is the middle position of the transversely displaced needle bar, generally utilized for straight stitching. From one needle-penetration action to the next, the feed dog 14 can feed the cloth being sewn a distance of 0 physical distance units (no feed at all), up to a distance of +15 physical distance units (15 physical distance units in the forwards direction), or up to a distance of −15 physical distance units (15 physical distance units in the reverse direction).

In FIG. 4, the pictorial representations of patterns P1–P8 are each provided with a numerical indication of the sequence of needle-penetration locations involved in the respective stitch-pattern. The last penetration location of each stitch pattern is additionally denoted by (1), to indicate that, here, implementation of the stitch pattern begins to repeat.

FIG. 6 depicts the stitch-control data contained in main memory $ROM_M$. In FIG. 6, the contents of sixty-two storage locations of $ROM_M$ are indicated. In this tabulation, and in those of FIGS. 7–9, use is made of the hexadecimal number system (base-16 instead of the decimal number system's base-10). The first sixteen numbers of the hexadecimal number system are 00, 01, 02, 03, 04, 05, 06, 07, 08, 09, 0A, 0B, 0C, 0D, 0E, 0F and 10. The next sixteen numbers of the hexadecimal number system are 11, 12, 13, 14, 15, 16, 17, 18, 19, 1A, 1B, 1C, 1D, 1E, 1F and 20. And so forth.

Column C of FIG. 6 lists the address numbers of the sixty-two depicted storage locations of $ROM_M$. Column C likewise represents sixty-two numerically consecutive counts on address counter C.

The entries in column X of FIG. 6 identify, likewise in the hexadecimal numbering system, the differing 5-bit code words stored in the X-data sections of each of the sixty-two depicted 10-bit storage locations of $ROM_M$.

Similarly, the entries in column Y of FIG. 6, identify, in the hexadecimal numbering system, the differing 5-bit code words stored in the Y-data sections of each of the sixty-two depicted 10-bit storage locations of $ROM_M$.

The X-data of $ROM_M$, when used at all, is used to control the transverse displacement of needle bar 3. The thirty-one transversely displaced positions of the needle bar indicated in FIG. 4—i.e., from 0 (R) through 15 (M) up to 30 (L) when expressed in physical distance units—correspond to the hexadecimal numbers 00 to 1E. Thus, for example the first storage location tabulated in FIG. 6 (C=00), in its X-data section, happens to contain the 5-bit code word denoted by 00 in the hexadecimal system. When this X-value is used to command a transversely displaced position for the needle bar, the needle bar moves to position 0 (R) in FIG. 4. The second storage location tabulated in FIG. 6 (C=01), in its X-data section, happens to contain the 5-bit code word denoted by 1E in the hexadecimal system; when this X-value is used to command needle position, the needle bar moves to position 30 (L) in FIG. 4. Position 15 (M) in FIG. 4 is commanded by the 5-bit code word denoted by hexadecimal number 0F in the X-column of FIG. 6. And so forth.

The Y-data of $ROM_M$, as already stated, is used either to control transverse needle-bar displacement or else to command feeding of cloth. When used to control needle-bar displacement, the code words represented in column Y of FIG. 6 correspond to the same needle positions as the identical code words in column X. I.e., the Y-column code word 00 commands needle-bar position 0 (R); the Y-column code word 0F commands needle-bar position 15 (M); and the Y-column code word 1E commands needle-bar position 30 (L) in FIG. 4.

However, as also stated above, the Y-data from $ROM_M$ is alternatively used for control of cloth feed. When the Y-data is used for cloth-feed control, the Y-column 5-bit code word represented by the hexadecimal number 00 commands that the cloth be fed by 15 distance units in the reverse direction in preparation for the next needle penetration; the Y-column 5-bit code word represented by the hexadecimal number 0F commands that the cloth be fed zero distance units (i.e., not be fed at all) in preparation for the next needle penetration; the Y-column 5-bit code word represented by the hexadecimal number 1E commands that the cloth be fed by 15 distance units in the forwards direction. I.e., the 31 different possible cloth-feed commands of FIG. 4 (from −15 to +15) are each represented by a different Y-data 5-bit code word, and in FIG. 3 each of these 31 different possible code words (or as many of them as are actually used) is represented by a respective one of 31 differing hexadecimal numbers.

As already stated, in FIG. 2 the X-outputs of $ROM_M$ are connected to the inputs of AND-gate AND1, whose output is connected via OR1 to the load input L of address counter C, and whenever the X-output 5-bit word produced by $ROM_M$ is 11111, the selected stitch pattern begins to be repeated. The 5-bit X-data word 1111 is represented, in FIG. 6, by the hexadecimal number 1F.

The numbers P1–P8 alongside the arrows at the outside of FIG. 6 indicate which storage location is the initially addressed storage location for each of patterns P1–P8. The last X-column entry of each of these patterns is 1F, representing the 5-bit code word 11111, which reinitiates the pattern for purposes of repetition.

FIG. 7 depicts the contents of the eight 8-bit storage locations of auxiliary memory $ROM_S$. When pattern P1 is selected, and for so long as pattern P1 is sewn, the ST-bit produced by $ROM_S$ is a "0"; the ST-bit is a "0" no matter which pattern is selected, unless the pattern selected involves a constant transversely displaced position for the needle bar throughout the whole of the pattern, as in the case of pattern P2 (see FIG. 4).

For pattern P1, the x-bit produced by $ROM_S$ is a "1". This commands that transverse needle-bar displacement be performed in accordance with the X-data.

For pattern P1, the y-bit produced by $ROM_S$ is a "0". This commands that the feeding of cloth be performed, not in accordance with the Y-data, but instead in accordance with the Ys 5-bit code word produced by $ROM_S$. For pattern P1, there is no need to use Y-data, because the sewn cloth is always fed by an identical distance and in only a single direction in proceeding from one to the next constituent needle penetration location of this particular pattern, as shown in FIG. 4.

For pattern P1, the 5-bit Ys code word produced is represented by the hexadecimal number 1E. This 5-bit Ys code word indicates by what constant physical distance and in what single direction the cloth is to be fed for this particular pattern. As shown in FIG. 4, for pattern P1 the cloth is each time fed by 15 physical distance units in the forwards direction.

In FIG. 7 for pattern P2, the ST bit produced by $ROM_S$ is a "1". This "1" bit is applied to the override input of the motor-control stage $DV_B$ for needle-bar adjuster motor $M_B$ of FIG. 2. Accordingly, during sewing of this pattern the needle bar remains in position 15 (M) of FIG. 4, as clearly shown in FIG. 4.

For pattern P2, the x-bit produced by $ROM_S$ is a "1". Accordingly, selector stage SEL1 transmits to its five outputs the X-data from $ROM_M$, not the Y data. In the case of this pattern P2, however, it is irrelevant whether the X-data or the Y-data are transmitted by SEL1, because the ST-bit value "1" anyway overrides and keeps the needle-bar position fixed.

For pattern P2, the y-bit produced by $ROM_S$ is a "1". Accordingly, forwards and backwards workpiece feed is performed in accordance with the Y-data produced by $ROM_M$. This is necessary for this pattern because, as shown in FIG. 4, the amount and direction of cloth feed from one needle penetration to the next are not constant in this pattern, it being in particular the direction of cloth feed which changes during implementation of this pattern.

For pattern P2, there is no entry in the Ys-column of FIG. 7. The contents of the Ys-section of the storage location in $ROM_S$ associated with pattern P2 is not used for anything at all.

The assignment of stitch-control data in accordance with the present invention will be best understood by returning to FIG. 6, and interpreting it in conjunction with FIG. 7 just explained.

The first three 10-bit storage locations (C=00 to C=02) of main memory $ROM_M$ are used as follows: The 5-bit X section of these three storage locations store control data pertaining to pattern P1. In particular, the control data stored in the X-sections of these three storage locations are used to control the transverse displacement of the needle bar for this pattern. The X-words stored in the first two of these storage locations each command a different respective position for the needle bar. The X-word stored in the third of these storage locations is 11111 (represented by 1F in FIG. 6) and commands a return to the first of these storage locations. The Y-data sections of these three storage locations happen, in this instance, not to store information of interest at all; the contents of the Y-data sections of these three storage locations happen not to be used for anything in the exemplary embodiment illustrated, i.e., are not used for pattern P1 nor for any other pattern available.

As tabulated in FIG. 6, the next seven storage locations (C=03 to C=09) of main memory $ROM_M$ are used as follows: The 5-bit X-section of each of these storage locations is used for needle-position control for pattern P3, with the 5-bit X-section of the last of these storage locations (C=09) containing the 5-bit word 11111 (represented by 1F in FIG. 6) commanding immediate return to storage location C=03. The 5-bit Y-section of each of these 10-bit storage locations (C=3 to C=9) is used to control the feeding of cloth during the sewing of stitch-pattern P3, the Y-section of the last of these storage locations (C=9) being of no interest, inasmuch as the X-section of the same storage location merely contains the return-to-start command 11111 (represented by 1F). As will be seen in FIG. 4 for pattern P3, both the needle-bar position and the amount and direction of cloth feed vary during implementation of this pattern; accordingly, in the storage locations (C=3 to C=9) containing stitch-control data for this pattern, it is necessary that both the X-sections and the Y-sections of these storage locations be used for this pattern.

Similar remarks apply to storage locations C=0A to C=1C. These storage locations are, as indicated in FIG. 6, used to store stitch-control data for pattern P4. The needle-bar position is not constant for this pattern; neither are both the amount and the direction of the cloth-feeding action constant for this pattern. Accordingly, it is necessary to use both the X-sections and the Y-sections of these storage locations just for the storage of stitch-control data for pattern P4 alone.

In FIG. 6, the situation is different for storage locations C=1D to C=23 of $ROM_M$. The X-sections of these storage locations contain stitch-control data for pattern P5 (for which reason P5 is first in the designation P5, P2 alongside location C=1D), whereas the Y-sections of these storage locations contain stitch-control data for pattern P2. In particular, the X-sections store needle-bar position commands for pattern P5, and the Y-sections store feed commands for pattern P2. As will be seen in FIG. 4, pattern P2 is characterized by a constant needle-bar position, with only the direction of the feed action varying during the pattern, whereas pattern P5 is characterized by a constant amount and single direction of cloth-feeding action, with only the position of the needle-bar varying during the pattern. Thus, use of storage space within $ROM_M$ for wasteful storage of one identical needle-bar command for pattern P2 after another, or for wasteful storage of one identical feed command for pattern P5 after another, is avoided. Instead, it becomes possible to "split" the storage locations C=1D to C=23 "down the middle", and to reserve half their storage capacity for one pattern and half for the other.

As shown for P5 in FIG. 7, the x-bit produced by auxiliary memory $ROM_S$ is a "1", meaning that the X-data from main memory $ROM_M$ is transmitted by selector stage SEL1 as if for needle-bar control. As shown for P2 in FIG. 7, the y-bit produced by $ROM_S$ is a "0" meaning that the Y-data from main memory $ROM_M$ is not transmitted by selector stage SEL2 for feed control. The constant feed command needed for pattern P5 is furnished at the Ys output of $ROM_S$. The constant needle-bar position command needed for pattern P2 is provided by the ST-output "1" bit from $ROM_S$, which simply overrides the X-data transmitted to motor-control stage $DV_B$ to maintain the needle bar at middle position 15 (M) in FIG. 4.

In FIG. 6, storage locations C=24 to C=2A store stitch-control data pertaining to pattern P6. As shown in FIG. 6, pattern P6 is characterized by varying needle-bar position, but constant feed amount and direction. The needle-bar position commands needed for this pattern are stored in the Y-sections of these storage locations. The X-sections of these storage locations happen not to be used for anything, in the exemplary embodiment here described. These X-sections could, as in conventional practice, be used for the feed command for this pattern P6, although the feed command stored in each of these X-sections would be the same in each X-section. Instead of doing this, the feed command needed is furnished at the Ys output of auxiliary memory $ROM_S$.

As shown in FIG. 6, in storage locations C=2B to C=3D, the X-sections of these storage locations contain stitch-control data for pattern P7 (indicated by listing P7 first in the expression P7, P8 to the right of the tabulation), whereas the Y-sections of these storage locations contain stitch-control data for pattern P8. As shown in FIG. 7, for P8, the x-bit from $ROM_S$ is a "0", which means that the needle-bar position commands come from the Y-data produced by $ROM_M$, i.e., the stitch-control data in the Y-sections of these storage locations is needle-bar command data for pattern P8. As shown in FIG. 7, for P7, the x-bit from $ROM_S$ is a "1", which means that the needle-bar position commands are supplied at the X-outputs of $ROM_M$. The constant feed command for pattern P7 is, as shown in FIG. 7, furnished by the Ys code word from $ROM_S$, and that for pattern P8 likewise furnished by the Ys code word from $ROM_S$.

For the sake of completeness, the operation of the patterning system depicted in FIG. 2 will be described with respect to pattern P8. FIG. 8 is a tabulation of the successive stitches of pattern P8, of the needle-bar positions and feed amounts expressed in physical distance units, and of the hexadecimal numbers used in FIG. 6 to represent the 5-bit control words which control needle-bar position and feed action. As can be seen in FIG. 4, the first needle penetration of pattern P8 is made with the needle bar at position 0 (R), the second at position 10 (measured in the physical distance units of FIG. 4), the third at position 0 (R) again, the fourth at position 20, the fifth at position 10, and so forth, this being tabulated in FIG. 8. As shown in FIG. 4, the direction of feed is always forwards, and the amount of each feed action is 3 physical distance units; this is tabulated in FIG. 8, likewise. The 5-bit commands for needle-bar positions 0, 10, 0, 10, 20, etc., tabulated in FIG. 8 (and expressed in physical distance units) are represented by the hexadecimal numbers 00, 0A, 00, 14, 0A, 14. The constant, forwards-direction feed of 3 physical distance unit amplitude is represented by the hexadecimal number 12.

When pattern selection switch SW8 is closed, auxiliary memory $ROM_S$ produces at its ST, x and y outputs the bit values "0", "0" and "0", and produces at its five Ys outputs a 5-bit code word represented by the hexadecimal number 12—ie., as shown in FIG. 7. Selector stage SEL1 transmits the Y-data from main memory $ROM_M$ to the motor-control circuit $DV_B$ for control of needle-bar position. Selector stage SEL2 applies the Ys-data from auxiliary memory $ROM_S$ to the motor-control circuit $DV_F$ for feed control. The address memory $ROM_A$, upon receipt of the same address signal as received by auxiliary memory $ROM_S$, produces an output signal constituting the initial address in $ROM_M$ for pattern P8, this being address C=2B in FIG. 6. Simultaneously, monostable multivibrator MM is triggered and applies a signal to load terminal L of address counter C, as a result of which the initial address C=2B is set on address counter C. In storage location C=2B, the Y-section thereof (FIG. 6), the entry 00 therein represents the 5-bit code word commanding that stepper motor $M_B$ displace neelde bar 3 to position 0 (R) in FIG. 4. When the needle reaches its lower dead point after the first needle penetration, as the upper shaft rotates pulse generator PG produces a "0" output signal, which is applied to the enablement input of motor-control circuit $DV_F$, as a result of which the cloth is fed by the amount and in the direction commanded by the 5-bit code word represented as hexadecimal number 12 in FIG. 8; i.e., feed adjuster 10 is set to provide a feed of +3 distance units. When the needle reaches its upper dead point with further rotation of the upper shaft, the pulse generator PG again produces a "1" output signal, and in response address counter C advances to its next count, C=2C in FIG. 6. The second stitch is formed with the needle bar at position 10 in FIG. 4 and with the next cloth feed action again being a forwards feed by 3 physical distance units. The subsequent stitches are produced in the same manner. The needle-bar position command for the last stitch of the pattern is stored in ROM storage location C=3C (FIG. 6). When next storage location C=3D is reached in $ROM_M$, the X-output thereof produces the code word 11111 (represented by hexadecimal number 1F), resulting in immediate application of a "1" signal to the load input L of address counter C, and therefore resulting in an immediate return to initial storage location C=2B of pattern P8, i.e., for repetition of the just finished pattern.

In FIG. 6, for the sake of simplicity, two patterns P2, P5 whose stitch-control data are shared by storage locations C=1D to C=23 happen to be constituted by the same number of stitches both. The end-of-pattern command 1F stored in the X-section of location C=23 serves to initiate pattern repeat, irrespective of whether pattern P2 or pattern P5 is involved. The two patterns P7, P8 are likewise constituted by the same number of stitches both. This corresponds to the fact that AND-gate AND-1 in FIG. 2 is connected to the X-outputs of $ROM_M$.

However, it is not necessary that the two patterns which share storage locations in $ROM_M$ be of identical stitch number. Instead, the end-of-pattern signal 11111 (1F) could be located in the X section of one storage location for one pattern, and for the other pattern be located in the Y-section of a different storage location. For example, in FIG. 6, if the data for P8 were omitted, the data for P6 could consist of a greater number of entries, extending down through to the end of the sequence of storage locations used for pattern P7, but in the Y-sections of those storage locations. In that event, instead of the one AND-gate AND1, a further such AND-gate could be provided, its output likewise connected to OR1, but its inputs connected to the Y-outputs of $ROM_M$. In that event, each of the two AND-gates would have one further input, both of which would be connected (although one of them via an inverter) to a further bit output of $ROM_S$, the further bit output of $ROM_S$ enabling one or the other of the two AND-gates for a given pattern. In this way, for some patterns, the end-of-pattern signal would be constituted by an X-section code word 11111 and for other patterns by a Y-section code word 11111.

Figure 5:
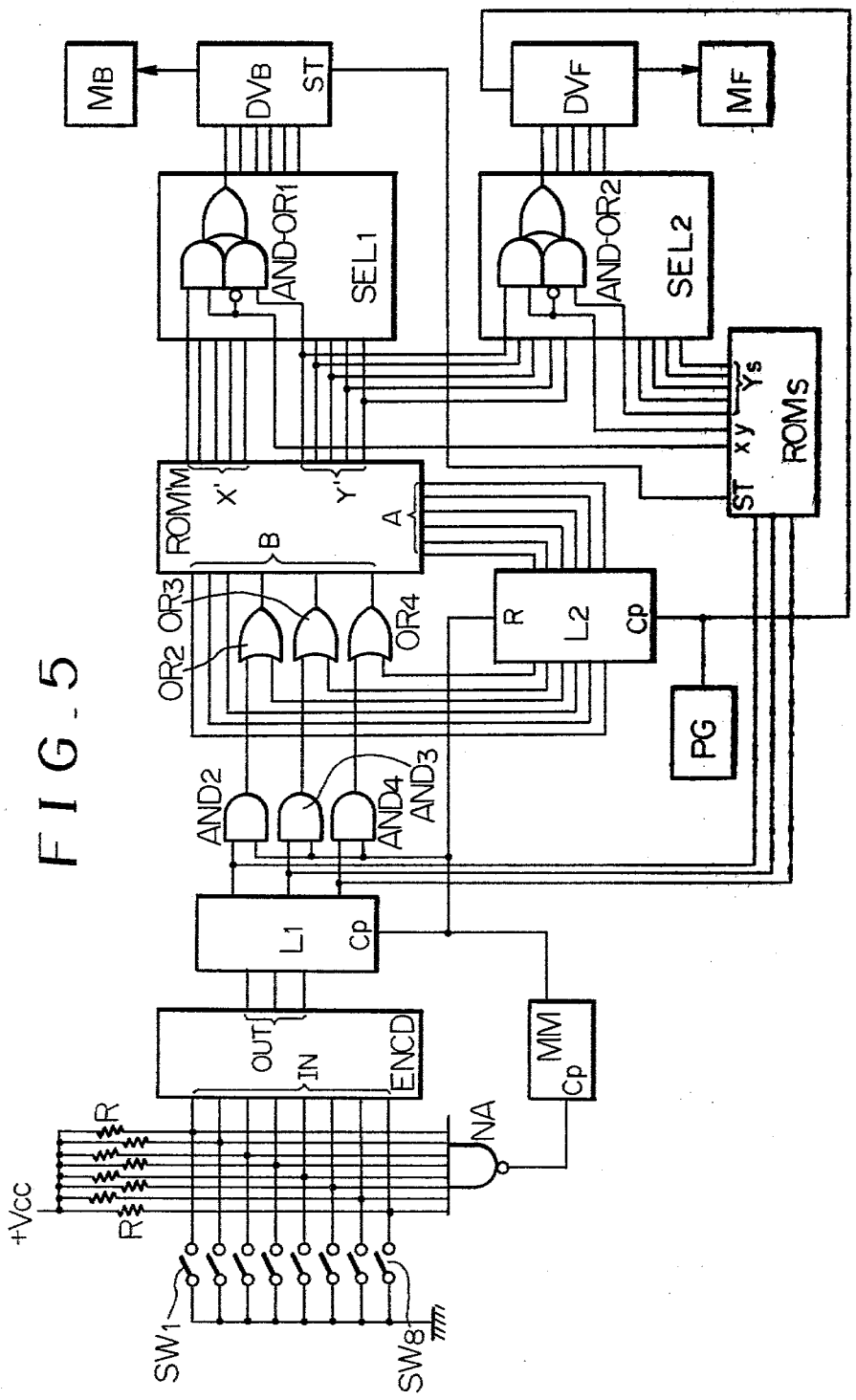
FIG. 5 depicts the circuitry of a second exemplary embodiment of the inventive patterning system.

FIG. 5 depicts another embodiment of the inventive patterning system, employing the next-address-signal technique of U.S. Pat. No. 4,086,862. The main memory $ROM_M$, in this embodiment consists of individually addressable storage locations each having a 16-bit storage capacity, the 6 bits of additional capacity being used for next-address signals which are read out at the six outputs A of $ROM_M'$. The A-outputs (next-address-signal outputs) of $ROM_M'$ are connected to respective ones of the six address-signal inputs B, through the intermediary of a latch L2, and, in the case of three of these six next-address-signal outputs A, through the further intermediary of respective OR-gates OR2, OR3, OR4. The three outputs of latch L1 are, as in FIG. 2, connected to the three address-signal inputs of auxiliary memory $ROM_S$, but additionally, via AND-gates AND2, AND3, AND4, to further inputs of OR-gates OR2, OR3, OR4. The enablement-signal inputs of AND2, AND3, AND4 are connected to the output of monostable multivibrator MM, as is also the reset input R of latch L2. The trigger input Cp of latch L2 is connected to the output of pulse generator PG.

In the embodiment of FIG. 5, the AND-gate AND1 of FIG. 2 is not employed, and the end-of-pattern action for pattern repeat is implemented by resort to the next-address-signal technique discussed earlier. FIG. 9 depicts the contents of the utilized storage locations within $ROM_M$, of FIG. 5. The roles of X' and Y' data are the same as in FIG. 6. The next-address data A contained in the A-section of each storage location identifies the address of the storage location containing the next-stitch stitch-control data of the respective pattern. Thus, the initial storage location for pattern P1 is L=00, and the next-address value in the A-section thereof is 08, identifying L=08 as the address of the next storage location to be read out, and so forth. The stitch-control data tabulated in FIG. 9 implements the same patterns P1–P8 already described with regard to FIGS. 3 and 4. The contents of auxiliary memory $ROM_S$ in FIG. 5 is the same as tabulated in FIG. 7.

The circuit of FIG. 5 operates as follows:

When one of selector switches SW1–SW8 is closed, a pattern-identifying code word appears at the outputs of L1 as in FIG. 2, but here is applied to the gates AND2, AND3, AND4. The closing of one of switches SW1–SW8 additionally triggers MM, whose output pulse briefly enables gates AND2, AND3, AND4, causing the pattern-identifying code word to be transmitted, via gates OR2, OR3, OR4 to the address-signal inputs of $ROM_{M'}$. The output pulse of MM has meanwhile reset latch L2, so that the signals at the upper three address-signal inputs of $ROM_{M'}$ will at this time all be "0" bits. With the first storage location of the selected pattern now addressed, the X', Y' and A data therein are transmitted to the correspondingly denoted outputs of $ROM_{M'}$. When thereafter pulse generator PG triggers latch L2, the next-address signals A are fed back to the address-signal inputs of $ROM_{M'}$ and serve to address the next storage location of the selected pattern. When the last storage location of the selected pattern has been read out, the next-address data A produced will be the address of the initial storage location of the pattern, for pattern repetition.

As shown in FIG. 9 the address (L) of the initial storage location for each pattern is different for each pattern, even for, e.g., patterns P7 and P8 which, here again, have their stitch-control data accommodated in different sections (the X' and Y' sections) of the same or shared storage locations.

If pattern P8 is selected, the initial storage location therefor is L=07, followed by storage location L=22, and then L=23 through L=31, followed by L=06, and then back to the initial storage location L=07. The stitch-control data for this pattern is stored in the Y' sections of these storage locations.

The stitch-control data for pattern P7 is stored in the same storage locations as for pattern P8, but in the X' sections thereof.

If pattern P7 is selected, the initial storage location therefor is L=06, followed by L=07 which happens to be the initial storage location for pattern P8. The last storage location for pattern P7 is L=31, which is followed again by the pattern's initial storage location L=06.

Thus, it will be seen for patterns P7 and P8 that, although they have different initial storage locations, they share the same storage locations, the data for one pattern being stored in the X' sections of these shared storage locations, and the data for the other pattern being stored in the Y' sections thereof.

Again, in the instance illustrated, patterns P7 and P8, whose stitch-control data occupy respective sections of the self-same or shared storage locations, are assumed to have equal numbers of constituent stitches. However, as explained with regard to the embodiment of FIG. 2, this need not be so. In FIG. 5, instead of having the return to the initial storage location effected by the next-address data stored in the last storage location of a pattern, use could be made of an AND-gate such as AND1 in FIG. 2 but with its output connected to the input of monostable multivibrator MM, and with a further such AND-gate similarly connected but to the Y' outputs of $ROM_{M'}$, and with auxiliary memory $ROM_S$ provided, as explained with regard to FIG. 2, with a further bit output for selecting which AND-gate is to be the one which monitors for the end-of-pattern code word (11111).

In the illustrated embodiments, when two patterns occupy different respective sections of shared storage locations, the stitch-control data pertaining to one is stored always in the X or X' sections of these locations, with the stitch-control data pertaining to the other stored always in the Y or Y' sections. However, from the foregoing explanations, it will be appreciated that still more intricate assignments of stitch-control data could be used, with the stitch-control data of such a pattern being stored in the X sections of some storage locations and in the Y sections of other storage locations. For example, in addition to the end-of-pattern code word 11111 (represented by 1F in FIG. 6), two further special pattern code words might be employed, detected by respective gates like AND1, for changing the state of selector stage SEL1 or SEL2 in the middle of implementation of the selected pattern. Using such technique, in FIG. 6 for example, the first nine stitch-control commands for P7 could be stored in the X-sections of storage locations C=2B to C=33, and the remaining nine in the y-sections of those same storage locations.

It will be understood that each of the elements described above, or two or more together, may also find a useful application in other types of circuits and constructions differing from the types described above.

While the invention has been illustrated and described as embodied in two different and merely exemplary patterning-system configurations, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a sewing machine of the type provided with electromechanical stitch-forming means responding to stitch-control data by changing the relative positions of the needle of the machine and the fabric being sewn on the machine, in combination, a main pattern memory containing a plurality of individually addressable storage locations and having stitch-control data outputs and address-signal inputs and operative for transmitting to the data outputs the data stored in whatever addressable storage location is addressed by an address signal applied to the address-signal inputs of the pattern memory;

means for selecting differing ones of a plurality of stitch-patterns whose stitch-control data are stored in addressable storage locations of the pattern memory and means for applying address signals to the address-signal inputs of the pattern memory, at least some of the individually addressable storage locations of the memory each comprising a first storage-location section storing stitch-control data pertaining to one stitch of a pattern but also comprising a second storage-location section storing stitch-control data pertaining to a different stitch, the first storage-location section and the second storage-location section of each such storage location not being addressable separately from each other, and means operative for applying to the electromechanical stitch-forming means stitch-control data alternatively derived from the first storage-location sections or else the second storage-location sections of the individually addressable storage locations.

2. In a sewing machine as defined in claim 1, the first storage-location sections of at least some of the storage locations each storing stitch-control data pertaining to one stitch of a pattern with the second storage-location sections of those storage locations each storing stitch-control data pertaining to one stitch of another pattern, the means applying stitch-control data alternatively derived from the first or else the second storage-location sections comprising means transmitting to the stitch-forming means stitch-control data derived from either the first or the second storage-location sections depending upon the pattern selected by the means for selecting differing stitch-patterns.

3. In a sewing machine as defined in claim 1, the stitch-forming means comprising first and second stitch-forming means of which one is operative for displacing the machine's needle transverse to the direction in which sewn cloth is fed through the machine and the other operative for feeding cloth through the machine, the stitch-control data for the first stitch-forming means for a predetermined pattern being stored in the first storage-location sections of a predetermined number of the addressable storage locations, said predetermined pattern being such that the stitch-control data for the second stitch-forming means is invariant for said predetermined pattern, furthermore including auxiliary memory means having a plurality of individually addressable storage locations of which one addressable storage location stores the invariant stitch-control data for said predetermined pattern and means for addressing the storage location which stores the invariant stitch-control data in response to selection of said predetermined pattern by said means for selecting differing stitch-patterns.

* * * * *